United States Patent
Kolawa et al.

(10) Patent No.: US 6,753,469 B1
(45) Date of Patent: Jun. 22, 2004

(54) VERY HIGH EFFICIENCY, MINIATURIZED, LONG-LIVED ALPHA PARTICLE POWER SOURCE USING DIAMOND DEVICES FOR EXTREME SPACE ENVIRONMENTS

(75) Inventors: Elizabeth A. Kolawa, Bradbury, CA (US); Jagdishbhai U. Patel, San Gabriel, CA (US); Jean-Pierre Fleurial, Duarto, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 34 days.

(21) Appl. No.: 10/214,486

(22) Filed: Aug. 5, 2002

(51) Int. Cl.[7] .................. H01L 31/04; H01L 31/06; H01L 31/068; H01L 31/072; G21H 1/00
(52) U.S. Cl. .................. 136/253; 136/261; 310/303; 310/305; 429/5; 250/370.01; 250/370.02; 250/370.04; 257/428; 257/429; 257/461
(58) Field of Search .................. 136/253, 261; 310/301, 305; 429/5; 250/370.01, 370.02, 370.04; 257/428, 429, 461

(56) References Cited

U.S. PATENT DOCUMENTS

| | | | | |
|---|---|---|---|---|
| 2,537,388 A | * | 1/1951 | Wooldridge | 330/308 |
| 2,604,596 A | * | 7/1952 | Ahearn | 250/371 |
| 2,745,973 A | * | 5/1956 | Rappaport | 310/303 |
| 4,277,293 A | | 7/1981 | Nelson et al. | 423/446 |
| 4,571,447 A | | 2/1986 | Prins | 136/252 |
| 5,155,559 A | * | 10/1992 | Humphreys et al. | 257/757 |
| 5,212,385 A | * | 5/1993 | Jones | 250/370.01 |
| 5,260,621 A | * | 11/1993 | Little et al. | 310/303 |
| 5,396,141 A | | 3/1995 | Jantz et al. | 310/303 |
| 5,440,187 A | | 8/1995 | Little et al. | 310/303 |
| 5,500,393 A | * | 3/1996 | Nishibayashi et al. | 438/105 |
| 5,859,484 A | * | 1/1999 | Mannik et al. | 310/303 |
| 6,064,137 A | | 5/2000 | Cox | 310/306 |
| 6,214,651 B1 | * | 4/2001 | Cox | 438/141 |
| 6,238,812 B1 | * | 5/2001 | Brown et al. | 429/5 |
| 6,288,321 B1 | | 9/2001 | Fleurial et al. | 136/205 |
| 2003/0107003 A1 | * | 6/2003 | Whitehead | 250/370.12 |

* cited by examiner

*Primary Examiner*—Alan Diamond
(74) *Attorney, Agent, or Firm*—John H. Kusmiss

(57) ABSTRACT

A power source converts α-particle energy into electricity by coulomb collision in doped diamond films. Alpha particle decay from curium-244 creates electron-hole pairs by freeing electrons and holes inside the crystal lattice in N- and P-doped diamond films. Ohmic contacts provide electrical connection to an electronic device. Due to the built-in electric field at the rectifying junction across the N- and P-doped diamond films, the free electrons are constrained to traveling in generally one direction. This one direction then supplies electrons in a manner similar to that of a battery. The radioactive curium layer may be disposed on diamond films for even distribution of α-particle radiation. The resulting power source may be mounted on a diamond substrate that serves to insulate structures below the diamond substrate from α-particle emission. Additional insulation or isolation may be provided in order to prevent damage from α-particle collision. N-doped silicon may be used instead of N-doped diamond.

18 Claims, 1 Drawing Sheet

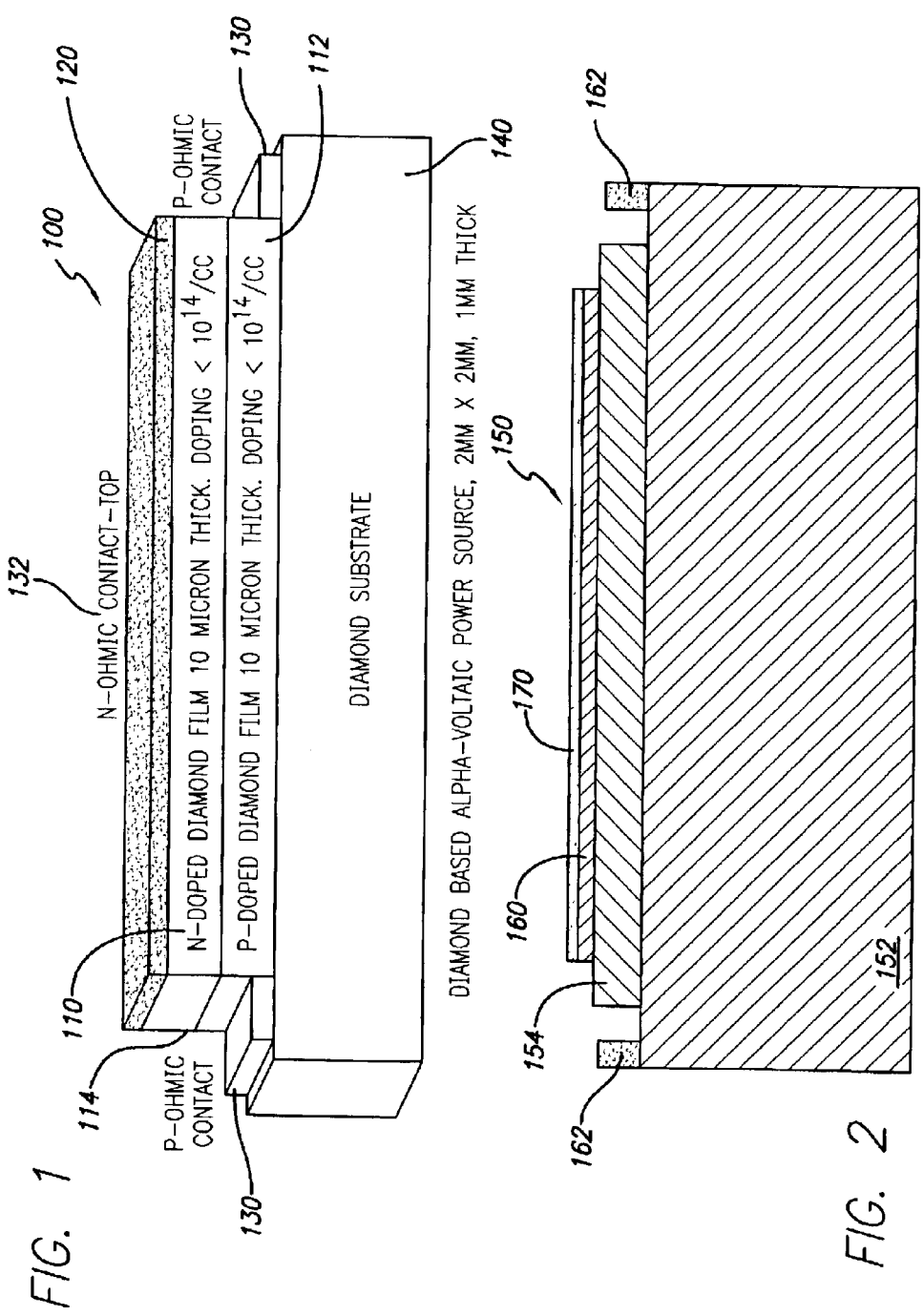

VERY HIGH EFFICIENCY, MINIATURIZED, LONG-LIVED ALPHA PARTICLE POWER SOURCE USING DIAMOND DEVICES FOR EXTREME SPACE ENVIRONMENTS

STATEMENT AS TO RIGHTS TO INVENTIONS MADE UNDER FEDERALLY-SPONSORED RESEARCH AND DEVELOPMENT

The invention described herein was made by the performance of work under a NASA contract, and is subject to the provisions of Public Law 96-517 (35 USC 202) in which the contractor has elected not to retain title.

BACKGROUND OF THE INVENTION

1. Field of the Invention

This invention relates to power sources, and particularly to an electrical power source giving rise to a current through the ionization of a doped diamond or other substrate by energetic alpha particles.

2. Description of the Related Art

While most people are familiar with electrical power in their homes and office as being available through an electrical socket or junction, all electrical power must be generated in some manner. Industrial-sized processes in plants allow the generation of megawatts of electricity for distribution over an electric grid powering cities and towns as well as major industrial facilities. However, there is a need for electrical power generation in environments that are otherwise isolated from large scale or other electric power grids. Such environments include orbital and deep space as well as open water and deep ocean exploration and activities.

Prior attempts in the art to supply electrical power for circuitry and equipment include the construction of radioisotope thermoelectric generators (RTGs) as well as lithium batteries, rechargeable batteries, and solar cell panels. Each of these forms of power generation has their advantages and disadvantages. They are also well-documented in the art.

In some circumstances, these prior art generators are not generally miniaturized in order to provide low-power sources. Additionally, the efficiencies of these generators leaves room for improvement as they are generally not very efficient and do not lead themselves to use in either low temperature or high temperature environments.

Consequently, there is significant room for improvement with respect to low-energy power sources provided on a miniaturized or other basis for space and ocean exploration missions. The present invention provides an alternative to prior art devices as well as advancing the art by delivering more efficient power source that is self contained and easily incorporated into advanced and highly-optimized equipment.

SUMMARY OF THE INVENTION

In view of the foregoing disadvantages inherent in the known types of power sources now present in the prior art, the present invention provides a very high efficiency, miniaturized, and long-lived power source wherein the same can be utilized for supplying electrical power where it would be unavailable otherwise.

The general purpose of the present invention, which will be described subsequently in greater detail, is to provide an very high efficiency, miniaturized, and long-lived power source which is not anticipated, rendered obvious, suggested, or even implied by any of the prior art power sources, either alone or in any combination thereof.

The present invention uses the kinetic energy of $\alpha$-particles emitted during radioactive decay. Alpha particles are the nuclei of helium atoms that are emitted and travel without the usual accompanying electrons present in un-ionized helium atoms. In comparison to beta particles (electrons) and gamma rays (high energy electromagnetic radiation), $\alpha$-particles are massive with kinetic energy that is readily-convertible to electrical energy under the proper circumstances. The present invention provides such circumstances in order to convert the comparatively large fraction of available kinetic energy to electrical energy. With the use of radioactive isotopes, such a power source can be used in environments that are isolated from other power sources.

A PN structure is provided in the form of N-doped diamond film and P-doped diamond film. The N- and P-doped diamond films are doped at low densities to maximize the depletion region for high efficiency operation. In one embodiment, curium 244 is used to provide $\alpha$-particles. The kinetic energy of the $\alpha$-particles generates free electron and hole pairs. A hole represents the absence of an electron in a covalent bond. Due to the built-in electric field, electrons and holes are separated and are forced to flow in opposite directions, creating a current which then can be used to power devices, including electronics.

Ohmic contacts are used to collect current from the PN junction. Additionally, the entire power generator may be situated atop a diamond substrate.

Diamond is the hardest substance known and generally has the same covalent electron and similar conduction properties as silicon. The crystalline form of carbon operates electronically in a manner very similar to that as crystalline silicon. However, diamond provides hardened substrates that resist degradation from radiation-induced defects and displacement damage without deteriorating. Additionally, the power source of the present invention can operate in both very cold and very hot environments without losing the ability to generate power.

Devices can be connected in series to elevate the voltage and in parallel to elevate the current.

Alternatively, an N-doped silicon substrate may be used for the N-type diamond layer.

The present invention provides a self-contained power source that may be used for powering many different devices not the least of which is electrical circuitry. Such a supply of power can be providing power to an otherwise power-isolated environment such as deep space, deep ocean, and other environments. The construction of the device is generally straightforward and available such that manufacture could occur without significant obstacles. In conjunction with curium-244 radioisotope, a useful life of approximately 18 years corresponding to the half-life of curium-244 is expected. Conversion of the approximately 5.8 mega electron volt (MeV) $\alpha$-particles may occur with a significant to high degree of efficiency to electrical energy. Additionally, the diamond-based device of the present invention lends itself to use in hostile environments requiring hardened or stable sources.

OBJECTS OF THE INVENTION

It is an object of the present invention to provide a power source that is self-contained.

It is another object of the present invention to provide a power source that is long-lived.

It is yet another object of the present invention to provide a power source that is efficient.

It is yet another object of the present invention to provide a power source that is small and/or subject to miniaturization.

It is another object of the present invention to provide a power source that lends itself to use in hostile or isolated environments.

It is yet another object of the present invention to provide a power source that is reliable.

It is another object of the present invention to provide a power source that is readily manufactured.

These and other objects and advantages of the present invention will be apparent from a review of the following specification and accompanying drawings.

BRIEF DESCRIPTION OF THE DRAWINGS

FIG. 1 is a schematic and perspective view of a power source cell implementing the present invention.

FIG. 2 is a schematic and cross-section view of an alternative embodiment of the present invention.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The very high efficiency, miniaturized, long-lived α-particle power source using diamond devices, for extreme space environments of the present invention 100 is shown in FIG. 1. The power source 100 has an N-doped diamond film 110 that is approximately 10 microns thick and is doped at a level approximately between $10^{14}$ and $10^{20}$ electrons (negative charge elements) per cubic centimeter, with $10^{15}$ being the currently preferred level. Adjacent to and shown immediately below the N-doped diamond film 110 is a P-doped diamond film 112 that has similar properties to those of the N-doped diamond film 110. The P-doped diamond film is also approximately 10 microns thick and is doped at approximately the same level of between $10^{14}$ and $10^{20}$ holes (charge-carrying elements) per cubic centimeter, again with $10^{15}$ being the currently preferred level.

FIG. 1 shows the power source 100 in relatively schematic form and the relative dimensions of the diamond films and generally the device itself. The device 100 may be approximately 2 millimeters by 2 millimeters and approximately 1 millimeter in thickness.

The N- and P-doped diamond films 110, 112 establish a PN junction 114 between themselves. Due to the relatively low doping of the diamond films, the depletion zone (or region that is present at the PN junction 114) is relatively wide and generally maximized. The extent of the depletion region volume allows for better transport of the electrons and holes across the PN junction while maintaining the directionality of the PN junction 114.

A radioactive substance 120 emitting energetic particles, such as curium-244, may be disposed above the N- and P-doped diamond films 110, 112. When the radioactive substance/curium-244 120 emits its radioactive decay products (α-particles), the α-particles energetically travel into the N- and P-doped diamond films. The mean travel length of the α-particles is approximately 20–30 microns. However, a significant number of them collide with electrons in the electron shells of the carbon and dopant atoms in the N- and P-doped diamond films 110, 112 as well as the dopants therein. When such coulombic collisions occur, electrons are knocked free and an electron-hole pair is formed with the hole being present in the electron shell where the now-free electron used to be. The α-particle continues to travel through the medium until it loses sufficient energy and is generally stopped in the medium. The electron is now free to travel through the N- and P-doped diamond film substrates 110, 112, as is the hole Free electrons in the N-doped diamond film 110 tend to migrate towards the P-doped diamond film 112 in order to fill the holes in the electron shells in the P-doped diamond film 112. However, electrons in the P-doped diamond film 112 are not attracted to the N-doped diamond film 110 due to the surplus of electrons that already exists (via the dopant) in the N-doped diamond film. This situation creates an electric bias in the power source 100 that can be used to drive an electric device, such as an electronic circuit as the electrons can generally travel only one way through the junction 114.

An ohmic contact 130 can conduct electrons away from the P-doped diamond film 112. A second ohmic contact 132 in contact with the N-doped diamond film 110 can introduce electrons into the N-doped diamond film 110. There is a voltage difference present between the P-ohmic contact 130 and the N-ohmic contact 132 that can be used to drive an electronic device due to the free electrons (and holes) generated by the radioactive curium-244 120 present at the PN junction 114.

As the half-life of curium-244 is approximately 18 years, the voltage difference present across the ohmic contacts 130, 132 is generally reliable for this period of time as the α-emission output of the curium-244 120 will be relatively level and even during this time. In order to isolate the power source 100 from adjacent materials, a neutral diamond substrate 140 can be provided upon which the N- and P-doped diamond films 110, 112 may rest. Additional insulation or isolation can be provided by additional materials surrounding the power source 100 with leads (not shown) from the P- and N-ohmic contacts 130, 132 allowed to pass through any surrounding insulating material.

Generally, the present invention can optimally provide power on the order of 20 milliwatts with a current of approximately 20 milliamps at 1 volt. Approximately 20 milligrams of curium-244 can be used to provide the 1 Curie amount of α-activity in order to drive the power source 100.

The present invention optimally provides a very high conversion efficiency, generally above 35%, in converting the kinetic energy of the α-particles into electrical energy. This allows the power source 100 to function in extreme space environments due to this high conversion factor, the long lived nature of the device, and its ability to withstand hostile environments including temperature extremes.

Prior experiments attempted to create similar devices using silicon carbide (SiC) photodiodes and gallium arsenide (GaAs) PN diodes. However, these experiments had limited success and were less efficient and degraded in a rapid manner indicating a much shorter operating life. Long operating life is particularly advantageous in deep space missions because the great distances present in space exploration and travel require power sources that are able to produce power reliably for a long period of time. Currently, research has indicated that the N-doped diamond layer 110 does not perform as well as might be expected. However, some current is available from the basic device 100 when N-doped diamond is used.

The power source of the present invention 100 carries tremendous enabling impact on future deep space and interstellar explorations as they provide power sources of long durations that allow operation in sun-obscuring deep space missions, are ideal for underwater and underground probes that may be used in missions to Mars and the Jupiter moon Europa, are able to operate under high temperature conditions such as probes used to explore the sun and Venus, and provide highly compact, very low mass per volume power sources that optimize the total mass of the spacecraft and allow propulsion to be conserved.

The power source 100 of the present invention may be integrated into the chips for which it is to supply power. It is also highly miniaturized and offers very high power density over a long period of time. For these advantageous features, generally straightforward manufacturing techniques, and long life, the power source 100 of the present invention provides a reliable means by which power can be supplied in hostile and isolated environments.

The diamond films 110, 112 and diamond substrate 140 can be applied through known techniques. Dopants can be introduced during the crystal-forming process in order to form the appropriate doped crystalline structures. In one embodiment, boron may be used as the dopant for the P-type diamond layers 112, 154. Additionally, curium may also be introduced in a similar manner. If possible, vapor deposition techniques might be used to create the films and layers needed for the present invention including the ohmic contacts 130, 132.

FIG. 2 shows an alternative embodiment of the present invention which may address the shortcomings possibly present with N-doped diamond and similar substrates.

A power source according to this embodiment could include a pair of devices, one of which is shown in FIG. 2. Each device 150 would contain Schottky and p/n diode devices made from high band-gap, radiation-hard diamond and/or silicon substrates. The n-layer 152 and the p-layer 154 in the diode portion may be doped in order to maximize the volume of the depletion region and thereby maximize efficiency. The diode layers may be supported by an un-doped diamond substrate (not shown).

As shown in FIG. 2, the p-doped layer 154 may be 5–10 micron thick boron-doped diamond with the doping on the order of $10^{19}/cm^3$. Additionally, the n-doped layer 152 may be N-doped silicon doped by approximately $5 \times 10^{15}/cm^3$. Alternatively, the doping schemes described above for FIG. 1 may be used, or otherwise.

A top ohmic contact layer of gold 160 may be used atop the p-doped layer 154. In conjunction with an aluminum ohmic contact 162 spaced from but circumscribing the p-doped layer 154 and atop the n-doped layer 152, current may be collected from the freed charges and charge flow arising from α-particle collisions.

The α-particle source may be positioned between two or more devices such as the one shown in FIG. 2. The α-particle source 170 may be disposed above the N-doped silicon 152 and the P-doped diamond 154 layers. As shown in FIG. 2, the silicon N-type layer 152 may be significantly thicker than the P-type diamond layer 154 to accommodate the weaker interatomic silicon crystal bonds that may suffer more damage from the α-particle collisions. Consequently, more silicon may be needed which requires a greater thickness where the general cross-sections of the N-layer 152 and P-layer 154 are similar.

As technology progresses, better electron current yields are expected from N-doped diamond although electron current yields are presently achieved.

While the present invention has been described with regards to particular embodiments, it is recognized that additional variations of the present invention may be devised without departing from the inventive concept.

What is claimed is:

1. A power source for providing electrical energy, comprising:
    a negative substrate for carrying negative charges;
    a positive substrate for carrying holes;
    at least one of said negative substrate and said positive substrate comprising a diamond material;
    a particle-emitting source radiating particles having kinetic energy, said particle-emitting source positioned proximate said negative substrate and said positive substrate; and
    said negative substrate and said positive substrate receiving said particles from said particle-emitting source to temporarily create ions within said negative substrate and said positive substrate; whereby
    a current is generated across said negative substrate and said positive substrate.

2. A power source for providing electrical energy as set forth in claim 1, wherein said negative substrate is N-doped material.

3. A power source for providing electrical energy as set forth in claim 2, wherein said N-doped material is N-doped diamond.

4. A power source for providing electrical energy as set forth in claim 3, wherein said N-doped diamond is doped with N-type dopant to provide N-type doping between approximately $10^{14}$ and $10^{20}$ electrons per cubic centimeter.

5. A power source for providing electrical energy as set forth in claim 2, wherein said N-doped material is N-doped silicon.

6. A power source for providing electrical energy as set forth in claim 5, wherein said N-doped silicon is doped with N-type dopant to provide N-type doping less than approximately $10^{14}$ electrons per cubic centimeter.

7. A power source for providing electrical energy as set forth in claim 5, wherein said N-doped silicon is doped with N-type dopant to provide N-type doping between approximately $10^{14}$ and $10^{20}$ electrons per cubic centimeter.

8. A power source for providing electrical energy as set forth in claim 1, wherein said positive substrate is P-doped material.

9. A power source for providing electrical energy as set forth in claim 8, wherein said P-doped material is P-doped diamond.

10. A power source for providing electrical energy as set forth in claim 9, wherein said P-doped diamond is doped with boron.

11. A power source for providing electrical energy as set forth in claim 9, wherein said P-doped diamond is doped with P-type dopant to provide P-type doping less than approximately $10^{14}$ holes per cubic centimeter.

12. A power source for providing electrical energy as set forth in claim 9, wherein said P-doped diamond is doped with P-type dopant to provide P-type doping between approximately $10^{14}$ and $10^{20}$ holes per cubic centimeter.

13. A power source for providing electrical energy as set forth in claim 1, wherein said particle-emitting source is positioned between said negative substrate and said positive substrate.

14. A power source for providing electrical energy as set forth in claim 1, wherein said particle-emitting source is an α-particle source emitting α-particles.

15. A power source for providing electrical energy as set forth in claim 14, wherein said α-particle source is curium-244.

16. A power source for providing electrical energy as set forth in claim 15, wherein said α-particle source is approximately 1 curie of curium-244.

17. A power source for providing electrical energy, comprising:

N-doped diamond film approximately 10 microns thick, said N-doped diamond film doped at a level of between approximately $10^{14}$ and $10^{20}$ electrons per cubic centimeter;

P-doped diamond film approximately 10 microns thick doped at a level between approximately $10^{14}$ and $10^{20}$ holes per cubic centimeter by boron dopant, said P-doped diamond film forming a PN junction with said N-doped diamond film;

an α-particle-emitting source radiating α-particles having kinetic energy, said α-particle-emitting source including approximately 1 curie of curium-244 positioned between said N-doped diamond film and said P-doped diamond film; and said N-doped diamond film and said P-doped diamond film receiving said α-particles from said α-particle-emitting source to temporarily create ions within said N-doped diamond film and said P-doped diamond film; whereby a current is generated across said N-doped diamond film and said P-doped diamond film.

18. A power source for providing electrical energy, comprising:

N-doped silicon substrate doped at a level of between approximately $10^{14}$ and $10^{20}$ electrons per cubic centimeter;

P-doped diamond film approximately 5 to 10 microns thick doped at a level between approximately $10^{14}$ and $10^{20}$ holes per cubic centimeter by boron dopant, said P-doped diamond film forming a PN junction with said N-doped silicon substrate;

an α-particle-emitting source radiating α-particles having kinetic energy, said α-particle-emitting source including approximately 1 curie of curium-244 positioned between said N-doped silicon substrate and said P-doped diamond film; and said N-doped silicon substrate and said P-doped diamond film receiving said α-particles from said α-particle-emitting source to temporarily create ions within said N-doped silicon substrate and said P-doped diamond film; whereby a current is generated across said N-doped silicon substrate and said P-doped diamond film.

* * * * *